US006981152B2

(12) United States Patent
Du et al.

(10) Patent No.: US 6,981,152 B2
(45) Date of Patent: Dec. 27, 2005

(54) SMART CARD SECURITY INFORMATION CONFIGURATION AND RECOVERY SYSTEM

(75) Inventors: Sterling D. Du, Palo Alto, CA (US); Miao Li, San Jose, CA (US); Chih Jen Kuo, Milpitas, CA (US)

(73) Assignee: 360 Degree Web, Inc., Santa Clara, CA (US)

( * ) Notice: Subject to any disclaimer, the term of this patent is extended or adjusted under 35 U.S.C. 154(b) by 845 days.

(21) Appl. No.: 09/919,076

(22) Filed: Jul. 30, 2001

(65) Prior Publication Data

US 2002/0029348 A1 Mar. 7, 2002

Related U.S. Application Data

(63) Continuation-in-part of application No. 09/796,847, filed on Feb. 28, 2001.

(60) Provisional application No. 60/221,306, filed on Jul. 28, 2000.

(51) Int. Cl.[7] .............................................. G06F 12/14
(52) U.S. Cl. ...................... 713/193; 713/182; 713/172; 713/185
(58) Field of Search ............................... 713/182, 185, 713/1–2, 100, 168, 172, 193

(56) References Cited

U.S. PATENT DOCUMENTS

| | | | |
|---|---|---|---|
| 5,944,794 A * | 8/1999 | Okamoto et al. | 709/225 |
| 5,983,273 A * | 11/1999 | White et al. | 709/229 |
| 5,995,965 A | 11/1999 | Experton | |
| 6,003,762 A | 12/1999 | Hayashida | 235/379 |
| 6,038,551 A | 3/2000 | Barlow et al. | |
| 6,161,176 A | 12/2000 | Hunter et al. | |
| 6,182,212 B1 | 1/2001 | Atkins et al. | |
| 6,199,114 B1 | 3/2001 | White et al. | |

(Continued)

FOREIGN PATENT DOCUMENTS

| | | | |
|---|---|---|---|
| FR | 2 772 957 | 12/1997 | ............. G07F 7/08 |
| GB | 2324395 A | 10/1998 | |

OTHER PUBLICATIONS

Clark et al., BITS: a smartcard operating system, ACM, vol. 37, Nov. 1994, pp. 68-69.*

(Continued)

*Primary Examiner*—Matthew Smithers
*Assistant Examiner*—Minh Dieu Nguyen
(74) *Attorney, Agent, or Firm*—Hickman Palermo Truong & Becker, LLP

(57) ABSTRACT

A smart card security information configuration and recovery system provides a secure Web site and server that allows smart card users to easily create and obtain smart cards and passwords. The client program accesses the smart card inserted into the client computer and retrieves the smart card's ID and other user and system information and sends them to the server which creates an access key. The access key and the smart card ID are stored in the client computer's CMOS or non-volatile memory for boot-up access. The client computer will boot only if the proper smart card is installed or the proper access key is entered when the smart card is unavailable. If the user loses his smart card, then he must gain access to his computer through the access key which the server issues after the user logs in. When the user wants to get a new smart card issued, he logs onto the server which is sent the new smart card's ID that replaces the previous smart card's ID and the server generates a new access key and stores it. The new access key and the smart card's ID are stored in the client computer's CMOS or non-volatile memory for boot access.

42 Claims, 17 Drawing Sheets

U.S. PATENT DOCUMENTS

| | | | |
|---|---|---|---|
| 6,260,111 B1 * | 7/2001 | Craig et al. .................. | 711/115 |
| 6,370,646 B1 | 4/2002 | Goodman et al. | |
| 6,438,550 B1 | 8/2002 | Doyle et al. | |
| 6,539,479 B1 * | 3/2003 | Wu ............................ | 713/151 |
| 6,581,162 B1 * | 6/2003 | Angelo et al. ............... | 713/193 |
| 2003/0001016 A1 * | 1/2003 | Fraier et al. ............ | 235/462.03 |
| 2003/0196085 A1 * | 10/2003 | Lampson et al. ............ | 713/156 |

OTHER PUBLICATIONS

Menezes et al., Handbook of Apllied Cryptography, 1997, p. 397.*

Office Action from China for foreign patent application No. 01808581.4 dated Jun. 11, 2004.

Current claims in China patent application No. 018085814.

* cited by examiner

SMART CARD SECURITY INFORMATION CONFIGURATION AND RECOVERY SYSTEM

CROSS REFERENCE TO RELATED APPLICATIONS

The present application is a continuation in-part of U.S. patent application Ser. No. 09/796,847, filed Feb. 28, 2001 (360D0001), and claims benefit of U.S. Provisional Patent Application Serial No. 60/221,306, filed on Jul. 28, 2000 (2173PROV).

BACKGROUND OF THE INVENTION

1. Technical Field

The invention relates to mobile computing in a computer environment. More particularly, the invention relates to storing, managing, and retrieving a mobile computer user's smart card security information.

2. Description of the Prior Art

The current computing environment requires users, in general, to physically carry either a laptop or a notebook portable computer in order to maintain a fully functional, truly personalized, computing environment when moving from place to place. Because laptop and notebook computers, though physically small, are comparatively bulky and heavy, mobile computer users continuously seek ever smaller and lighter devices that will provide and maintain their personalized computing environment.

An example of such a smaller and lighter device that has recently enjoyed significant commercial popularity is the personal digital assistant ("PDA"). However, even though PDAs are smaller and lighter than laptop or notebook computers and provide a personalized computing environment, they do not presently offer the full functionality of desktop, lap top or notebook portable computers.

For example, when aPDA is removed from an environment in which a computer user has a fully functional computing environment, the PDA must first be loaded with an up-to-date image of data for pertinent portions of that environment, e.g., an address book, calendar, email, etc. Similarly, when a PDA returns to the fully functional computing environment, data in the PDA that has changed since leaving the fully functional computing environment must be transferred and/or synchronized from the PDA back into the user's regular computer and vice versa.

Desktop computers capable of accessing the Internet are ubiquitous in industrialized countries worldwide. A computer user, while traveling, can usually obtain access to such a computer and use that computer's Internet access to communicate worldwide. With sufficient data and appropriately configured, such computers could, in principle, provide mobile computer users with a fully functional personal computing environment. However, establishing a mobile computer user's fully functional computing environment at a remote or transitory location, e.g., in an airport kiosk or overnight lodging, requires error-free entry of a prodigious amount of highly detailed information to configure the local computer.

The amount of information required to configure a local computer so It provides the mobile computer user's fully functional, personal computing environment is disproportionately large in comparison with the benefit obtained. Consequently, there presently does not exist any convenient hardware and software that permits mobile computer users to move from computer to computer anywhere in the world, carrying with them their personalized, fully functional computing environment.

Presently, smart cards are used primarily for facilitating financial transactions. However, because smart cards include at least a limited amount of non-volatile readable and writeable memory and may also include a programmable processor, they inherently possess a capability for use in applications other than financial transactions. Storing data into a smart card, accessing that data, and activating a smart card's processor to execute a computer program all require that the smart card be interconnected with some type of reader/terminal. This characteristic of smart cards limits the potential for broadening their use for mobile computing applications because, in general, there does not presently exist an infrastructure that supports the use of smart cards for applications other than financial transactions.

It would be advantageous to provide a smart card security information configuration and recovery system that provides a user with exclusive access to his computer and secure logins into networks and Web sites using a smart card. It would further be advantageous to provide a smart card security information configuration and recovery system that allows the user to easily replace a lost smart card.

SUMMARY OF THE INVENTION

The invention provides a smart card security information configuration and recovery system. The system provides a user with exclusive access to his computer and secure logins into networks and Web sites via a smart card. In addition, the invention provides a secure method for reproducing the security information on a lost smart card.

A preferred embodiment of the invention provides a secure Web site and server that allows smart card users to easily create and obtain smart cards and passwords. A password and user question are created for the user. The password is used for access to the server if the smart card is lost and the user question is used to confirm the user's identity when challenged while accessing the server without a smart card.

The client program accesses the small card inserted into the client computer and retrieves the smart card's ID and other user and system specific information. The data are sent to the server across the Internet or network and an access key is created.

The access key and the smart card ID are stored in the client computer's CMOS or non-volatile memory for boot-up access. The client computer will boot only if the proper smart card is installed or the proper access key is entered when the smart card is unavailable. An emergency diskette is optionally created and the user's computer can boot using the diskette as a replacement for the smart card.

If the user loses his smart card (and emergency diskette), then he must gain access to his computer through the access key route. The user logs onto the server through another computer. The server, issues an access key to the user after the user logs in. Access to the client computer is gained using the access key.

When the user wants to get a new smart card issued, he logs onto the server. The new smart card's ID is retrieved from the smart card. The smart card's ID is sent to the server to replace the previous smart card's ID and the server generates a new access key and stores it. The new access key and the smart card's ID are stored in the client computer's CMOS or non-volatile memory for boot access.

The invention can also more the user's personal computing environment, encryption and other rights that were stored in the previous smart card into the new smart card.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in a smart card security information configuration and recovery system in a computer environment. A system according to the invention provides a user with exclusive access to his computer and secure logins into networks and Web sites via a smart card. In addition, the invention provides a secure method for reproducing the security information on a lost smart card.

The invention provides a mobile computer user with a system that is extremely compact, and yet permits the user to carry with him sufficient machine readable data to easily establish his fully functional mobile personal computing environment anywhere in the world.

A preferred embodiment of the invention stores, in a smart card, sufficient information to permit characterizing a mobile computer user's personalized, fully functional computing environment. The information that the mobile personal computing environment supplies may differ from system to system. However, the amount of information stored in the smart card is sufficient to create a consistent computing environment for the user. Information such as operating system preferences, favorite Web sites, email addresses, credit card information, ISP information, program preferences, program environments, etc. are stored in the smart card.

Figure 1:
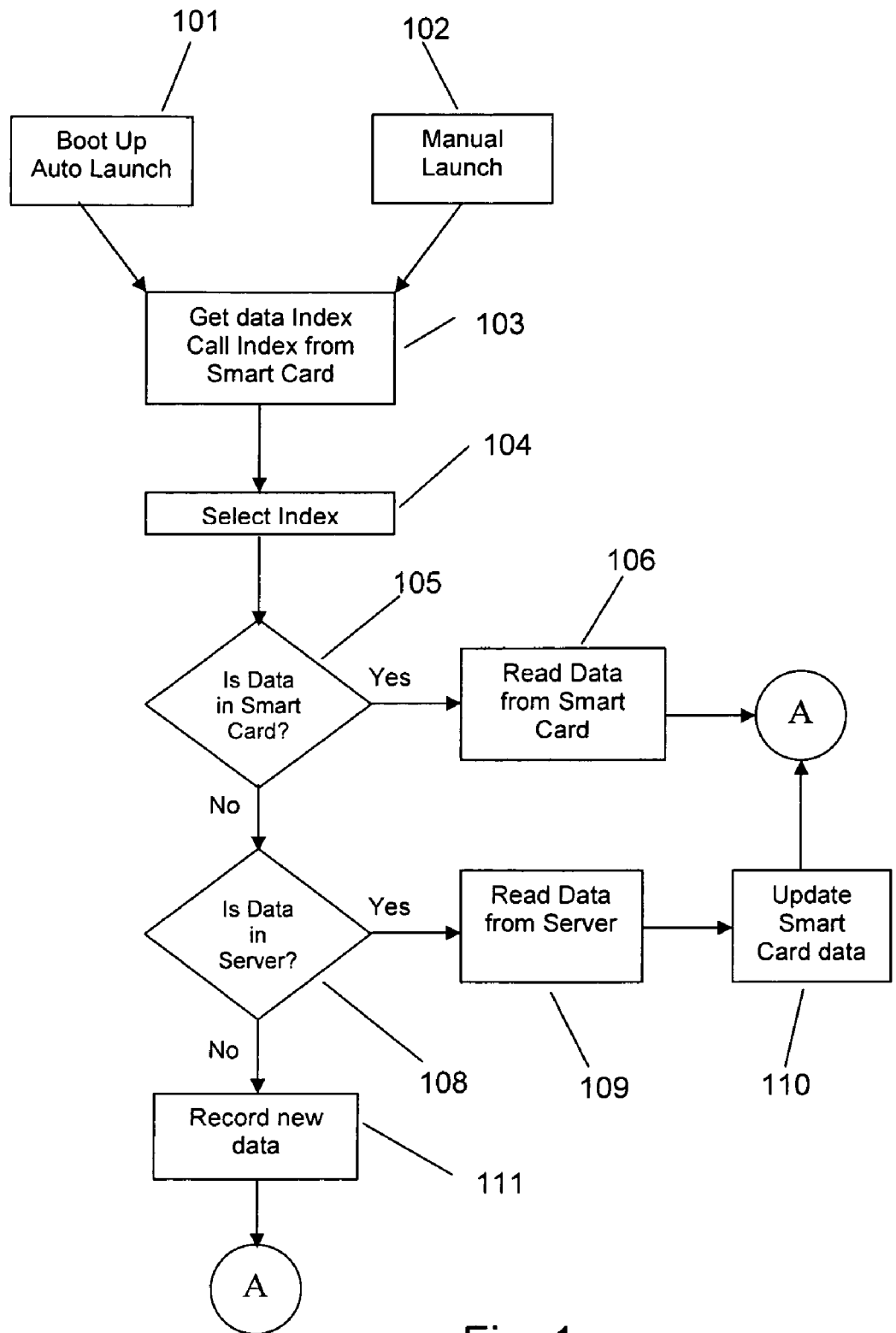
FIG. 1 is a flowchart showing the execution flow of the client to server exchange when the user specifies the indices required for his personal computing environment according to the invention.

Referring to FIG. 1, the user activates the invention's client computer program through an auto launch at boot-up 101 or through a manual launch 102 when he begins to use client computer. A smart card reader/terminal is connected to, or resident in, the user's computer, reading the user's smart card. The client computer program retrieves indices from the smart card 103. The user specifies to the invention the data needed to establish at least a portion of his mobile personal environment through the invention's user interface 104.

The invention checks the smart card to determine if the specified data is present in the smart card's local memory 105. If the specified data is in the smart card's memory, then the invention retrieves the data from the smart card for subsequent use by the invention 106. If the specified data is not in the smart card's memory, then the invention accesses, via the Internet or other method, a secure server that stores additional data which more fully characterizes the mobile computer user's personalized, fully functional computing environment 108. The invention then retrieves the specified data from the server for subsequent use by the invention 109 and updates the smart card data 110. If the data is not on the server 108, then it is new data from the user which must be recorded and used to access the Internet 111.

Figure 2:
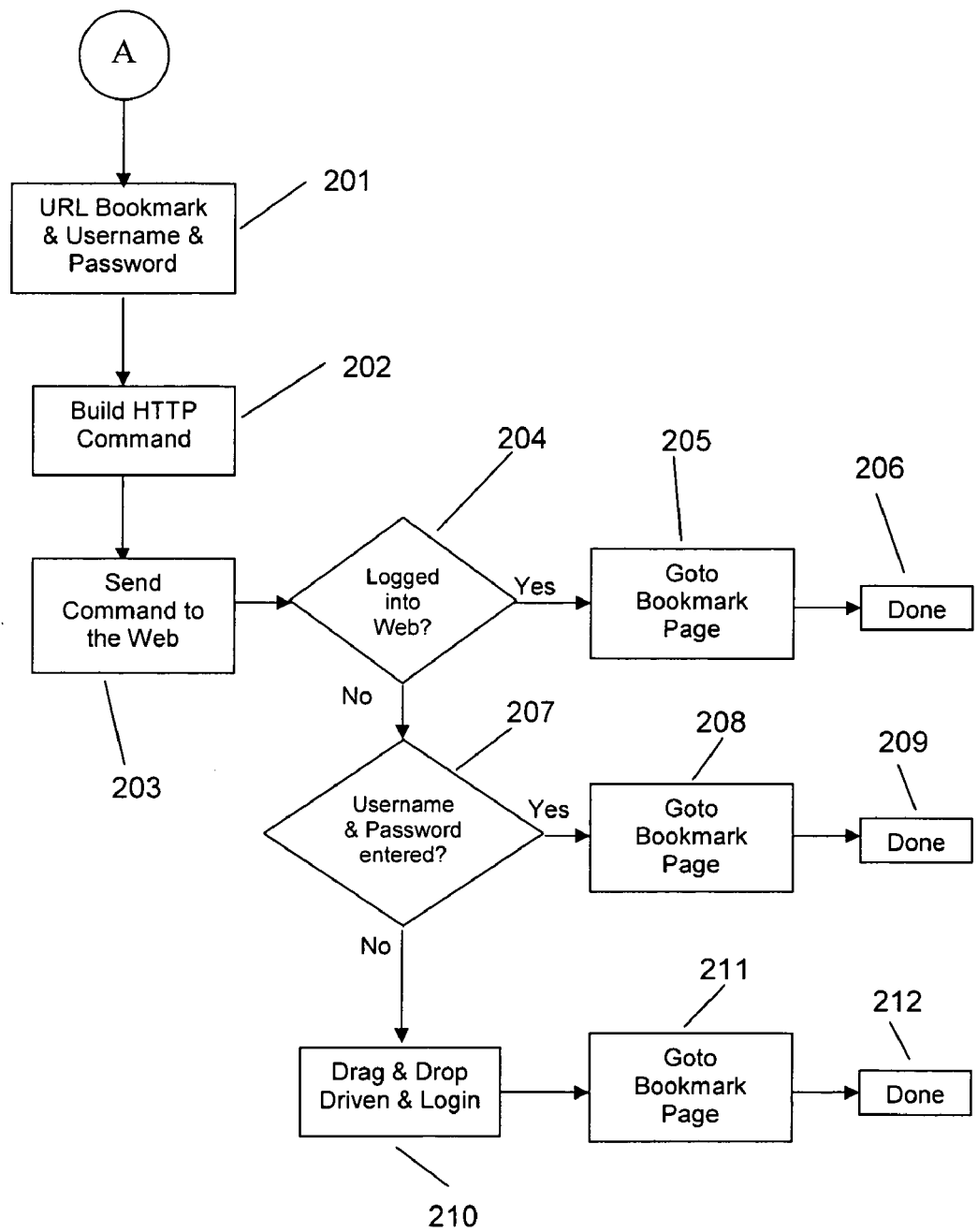
FIG. 2 is a flowchart showing the execution flow of the client to server exchange when the user specifies the indices required for his personal computing environment according to the invention.

With respect to FIG. 2, having retrieved the required data either from the smart card, the server, or directly from the user, the client computer program uses the data to construct a Uniform Resource Locator (URL) 201 and, if possible, gather the username, password, and Internet site bookmark data needed to immediately and directly access an Internet site that constitutes at least some part of the mobile computer user's mobile personal environment 202.

Using the data constructed in this way, the invention then builds a URL command and sends it to the Internet 203. The URL, username, password and Internet site bookmark data, if complete, permit the mobile computer user to log onto the specified Internet site 204 and proceed immediately to a specified page at that Internet site 205. If some information is incorrect or incomplete, interacting with the Internet site accessed by the URL, the mobile computer user can either enter, as required, the username, password, and Internet page data to access a desired Internet page 207, 208, or may supply that information through a graphical user interface (GUI) that provides a drag and drop capability 210, 211.

Figure 3:
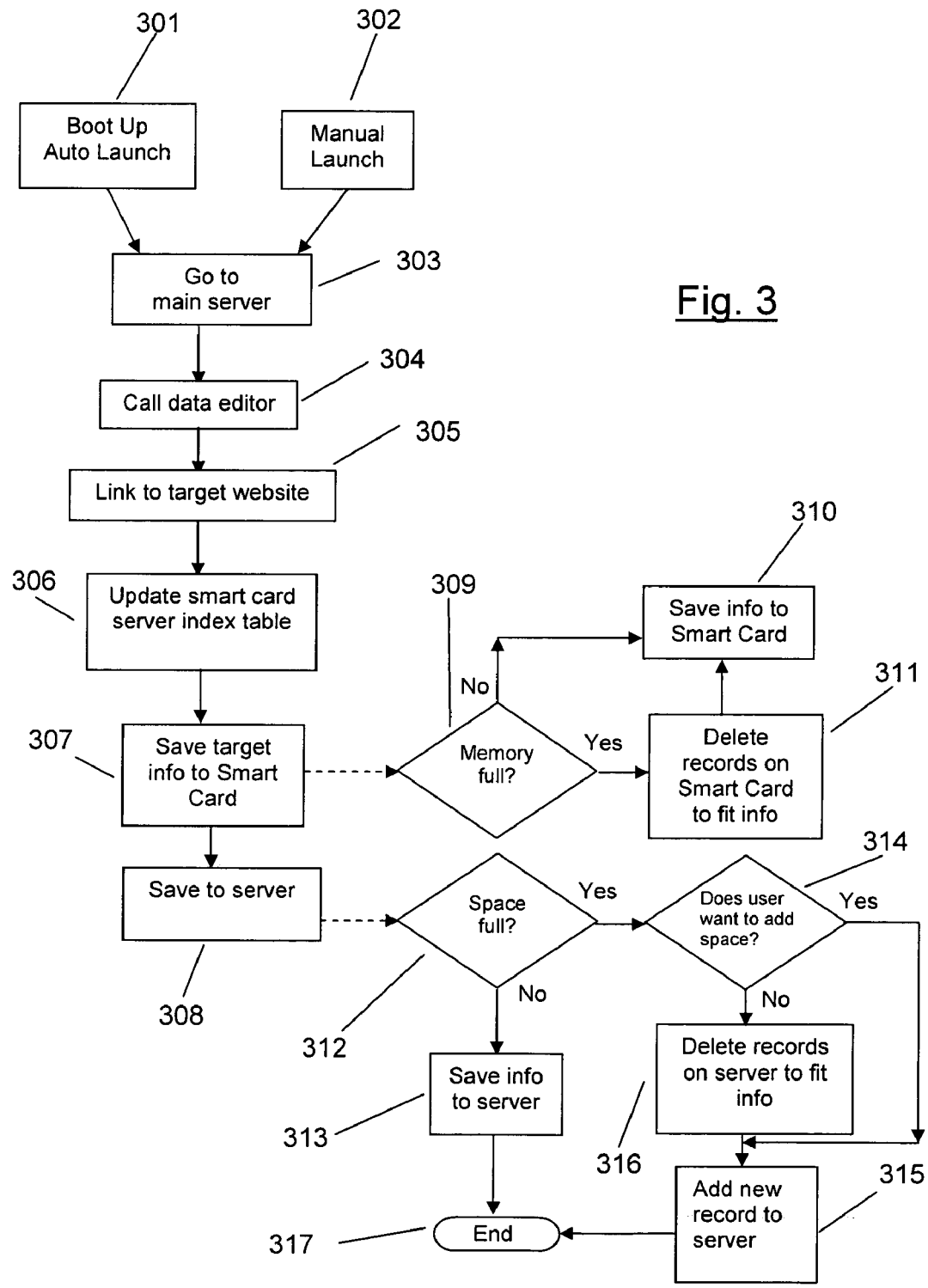
FIG. 3 is a flowchart showing the schema for managing a user's personal computing environment data between a server database and a smart card according to the invention.

Referring to FIG. 3, to initialize or update indices stored on the smart card, the user activates the invention's client computer program 301, 302, instructing the program to access, via the Internet or other method, the server that stores additional information which characterizes a mobile computer user's personalized, fully functional computing environment 303. The server permits the user to change data characterizing his personalized mobile personal environment 304, for example, adding a new Internet site to his environment. After the user specifies changes to be made in his mobile personal environment, the server links to the specified Internet site and determines updated indices for storage on the smart card 305.

After linking to the specified Internet site and updating the computing environment information stored at the server 306, the invention attempts to update the indices stored on the user's smart card connected to his computer 307. If the smart card memory is full 309, then one record is deleted from those stored in the smart card until the smart card has sufficient free memory to store the updated indices 311, updated index is then written into the smart card's memory 310. Otherwise, if the smart card memory is not full 309, then the updated indices are immediately stored on the smart card 310. In addition to saving the updated indices on the smart card, the server also saves the updated index in its database which characterizes this mobile computer user's mobile personal environment 308.

If the amount of unused storage in the server's database is sufficient to store the updated indices 312, then the information is stored in the database 313. Otherwise, the server first offers the user an opportunity to allocate more server storage for his indices 314. If the user defines the offer of additional storage, then the server deletes one record from the database until the server has sufficient free memory to store the updated indices 316. The server then adds the updated index to the indices stored in the database 315. If the user accepts the offer of additional storage 314, then the new index is added to the server's database 315. The mobile computer user is able to initially specify and, as required, update data that characterizes his mobile personal environment.

The user is allowed to create sets of indices when storing a larger amount of information on the server than is available on the user's smart card. The user can then choose between different sets of information to be downloaded to his smart card. For example, the user can set his smart card to his personalized mobile computer environment for his U.S. office, foreign office, or even his home. This allows the user to characterize each separate and distinct computer system that he uses.

One skilled in the art will readily appreciate that although the mobile computer user's personalized computer environment is specifically mentioned above, any other type of information, such as personal data, financial data, operating system, computer personality, video and/or audio data, etc., are easily substituted in its place.

Figure 4:
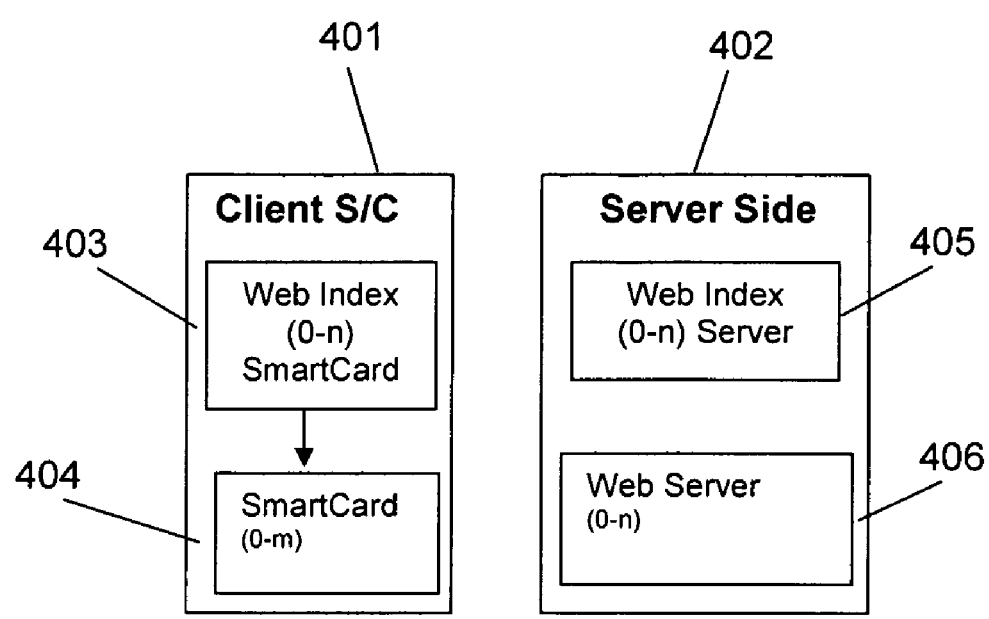
FIG. 4 is a block schematic diagram showing the user's indices accessible on a client and a server according to the invention.

With respect to FIG. 4, the invention provides an infrastructure that permits using smart cards for applications other than financial transactions. The smart card 404 is interconnected with a smart card reader/terminal that can communicate via the Internet, extranet, or intranet 402. Using this device 401, a computer user specifies characteristics for some computing function. Presuming that the reader/terminal is connected to the user's personal computer, an index for the specified computing function is stored into that computer's memory 403. Also, the index is stored both into the smart card 404 and into a server accessible via the Internet, extranet, or intranet 402, 405, 406.

Figure 5:
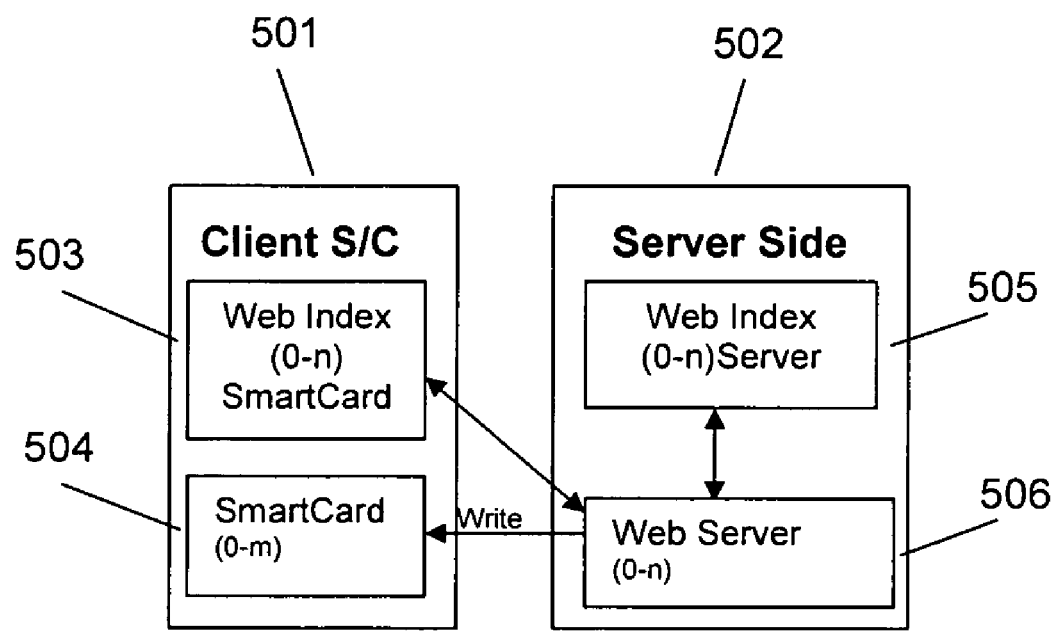
FIG. 5 is a block schematic diagram showing the exchange of the user's indices between a client and a server according to the invention.

Referring to FIG. 5, in general, the smart card stores only a fraction of a computer user's total indices since smart cards possess only a limited amount of memory. When those indices completely fill the available smart card memory 504, addition of another index causes the least recently used index to be deleted from the smart card's memory 504. However, because the server may, in principle, store more indices 505 than the smart card 504, the index discarded from the smart card 504 can remain stored and accessible at the server 502, 506. In this way, the smart card 504 carries indices that characterize at least some fraction of computing functions specified by individual computer users 503, 505, thereby making those functions accessible to the computer user worldwide 506 at any suitably programmed smart card reader/terminal.

Figure 6:
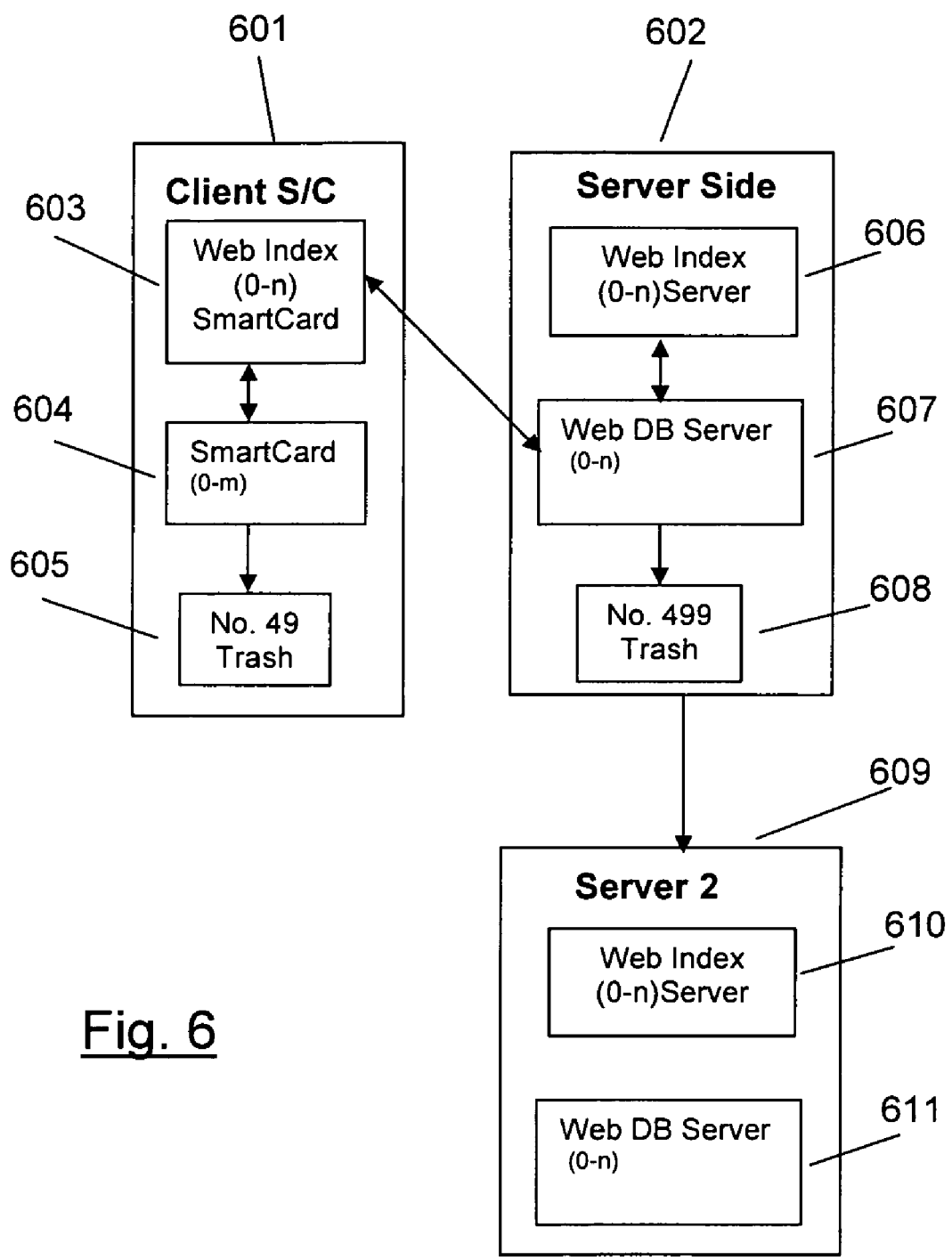
FIG. 6 is a block schematic diagram showing the exchange of data between the user's smart card, a client, a server, and a redundant server when a user index is deleted according to the invention.

With respect to FIG. 6, in accessing a pre-specified computer function, the smart card 604 is placed in a suitably programmed reader/terminal 601 from which the index stored in the smart card 604 is transferred to that reader/terminal or host computer device's memory 603. If the requested index is not present in the smart card's memory 604, the device 601 then accesses the server 602 via the Internet, extranet, or intranet 607 to retrieve the index that is stored there 606. Because retrieving a particular index from the server 602 makes It the most recently used index, the device 601 transfers the index both to the device's memory 603 and replaces the least recently used index 605 in the smart card's memory 604 with the most recently used index. If a new index is added to the server database 606 when the database 606 is full, the system either discards the least recently used index 608 or, if possible, gives the user the option to allocate more server storage for his records, as described above.

Another preferred embodiment of the invention adds a backup server 609 that contains a consistent copy of the entire user database 606 served by the main server 602. If the main server 602 fails, the backup server 609 takes over. The backup server's database 610 and external interface 611 are identical to the main server's 602 components.

Additionally, a plurality of servers can be used along with load balancing, to handle large amounts of client requests. The client can perform its own load balancing among the servers by using, for example, the response time (RTT) from each server to determine the best choice. If the main server serving the user fails or is otherwise inaccessible, then the client will automatically switch to another server.

Figure 7:
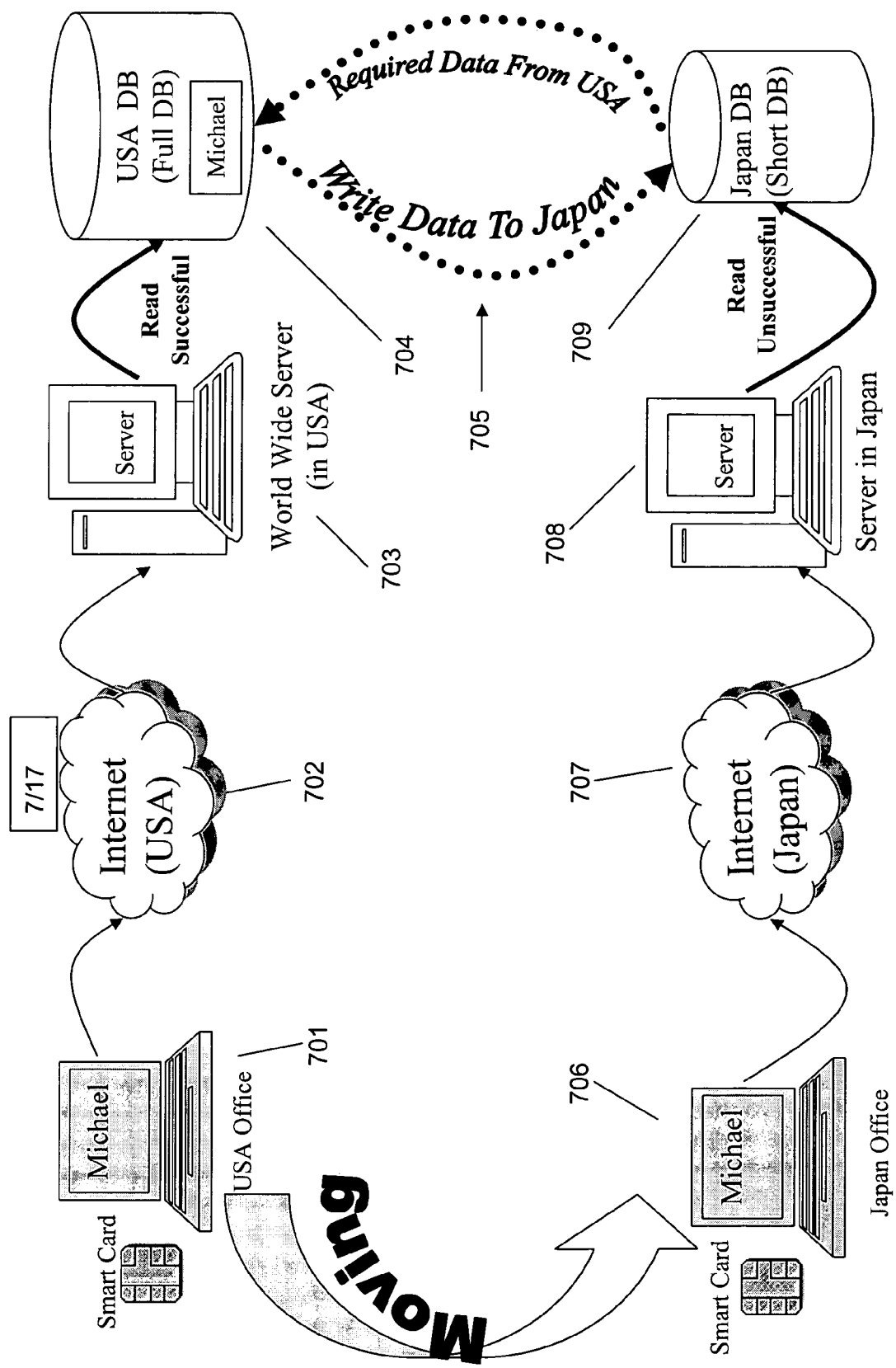
FIG. 7 is a block schematic diagram depicting a scenario when the server responsible for a particular user is switched when the user relocates according to the invention.

Referring to FIG. 7, to efficiently utilize server resources distributed at various locations throughout the world, the invention records places in the world from which a user accesses his mobile personal environment. Recording such data permits the server to reasonably determine that a user has moved from one place to another, e.g., from the United States to Japan. For example, if a user who had previously accessed his mobile personal environment 704 mostly from the United States 701, 702, 703 suddenly began accessing that environment 704, 709 entirely from Japan 706, 707, 708 for an extended interval of time, e.g., one or two months, then the server 704 can reasonably determine that the user has moved from the United States to Japan. If the server 704 determines that the user has relocated his residence and if there exists another server 709 that is located physically closer to the user's new residence, then the systems operating on both servers 704, 709 effect a transfer of the user's mobile personal environment indices 705 from the more remote server 704 to the nearer server 709.

The invention allows mobile computer users to carry, on a single smart card, all the information required to characterize their mobile personal environment and to quickly establish their mobile personal environment anywhere in the world.

Figure 8:
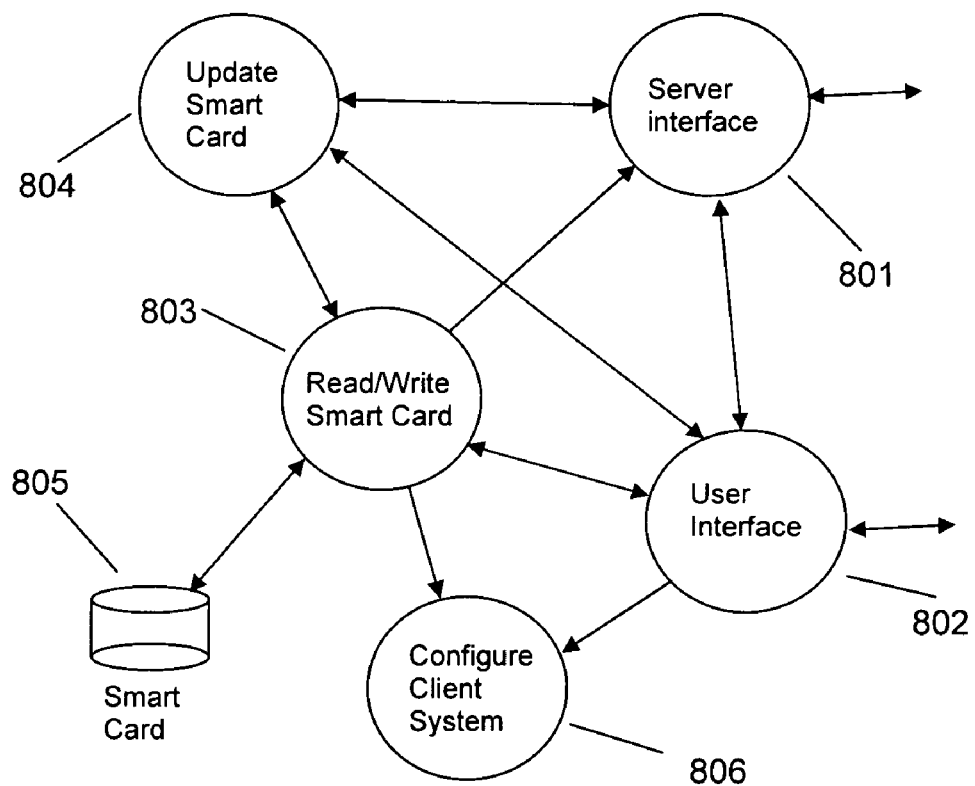
FIG. 8 is a block schematic diagram of a task-oriented viewpoint of a preferred embodiment of the invention illustrating the client and server tasks for a server-based data management system according to the invention.
Figure 8:
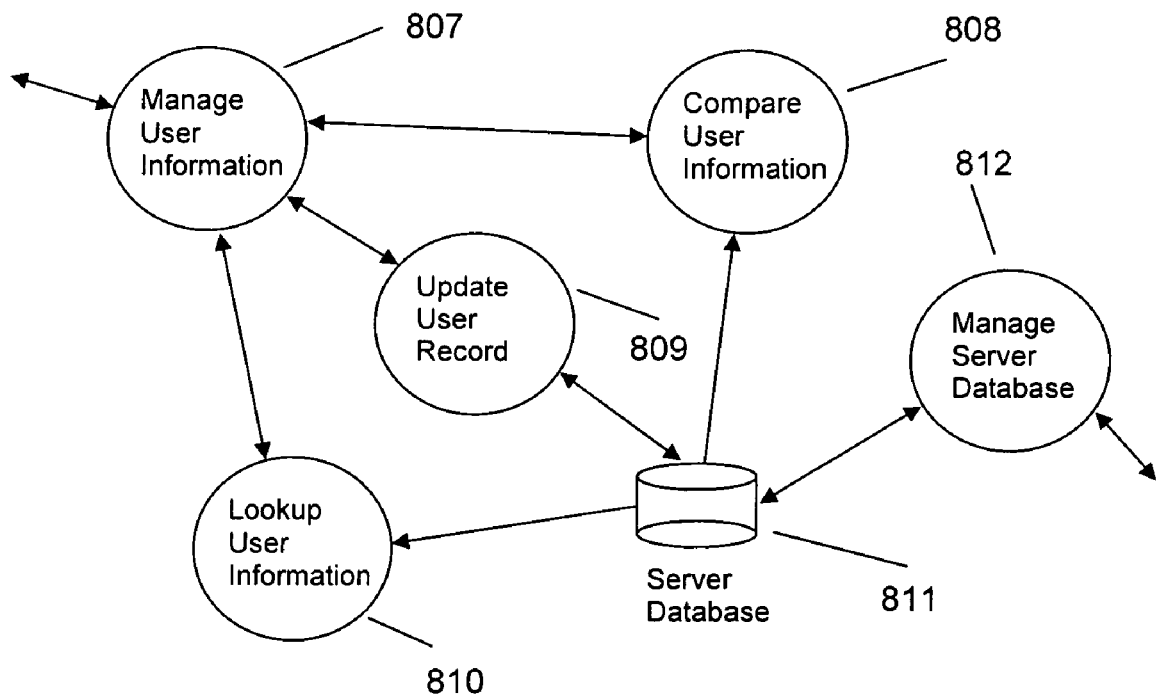

With respect to FIG. 8, a high-level task viewpoint of a preferred embodiment of the invention is shown. The user plugs his Smart Card 805 into the smart card reader that is connected to, or resident in, the client computer. The Configure Client System module 806 reads the Smart Card 805 through the Read/Write Smart Card module 803. The Configure Client System module 806 either automatically configures the client computer to the user's personal computing environment or queries the user through the User Interface 802 for the information needed from the Smart Card 805 to configure the user's personal computing environment (as described above), depending on the user's preference settings.

The user can also manage the indices stored on his Smart Card 805 and the Server Database 811. The Server Interface module 801 communicates with the secure server containing the user's information. The communication is through the secure Web site provided by the Manage User Information module 807 on the server. The Manage User Information module 807 displays the user's indices stored on the Server Database 811. The user requests his indices through the secure Web site. His indices are retrieved from the Server Database 811 by the Lookup User Information module 810. The Lookup User Information module 810 relays the index information to the Manage User Information module 807. The indices resident on the user's Smart Card 805 are sent to the Manage User Information module 807 through the Server Interface 801. The smart card indices are compared with the user's indices from the Server Database 811 by the Compare User Information module 808, which correlates and compares any differences between the two sources. The Manage User Information module 807 displays the information to the user through a secure Web page.

The user can create (for new users), add, delete, and update his indices through the User Interface module 802 connection to the secure Web page. The Server Database 811 indices are updated through the Update User Record module 809. Smart Card indices are up dated by the Manage User Information module 807 through the Server Interface 801. The Server Interface 801 sends the update information to the Update Smart Card module 804. The Update Smart Card module 804 writes the information to the Smart Card 805 through the Read/Write Smart Card Module 803.

In the case of multiple servers, the Server Database 811 is redundantly stored among other servers. The Server Database 811 is updated with information from other servers by the Manage Server Database module 812. Any new updates to the Server database 811 that are initiated locally are sent out to other servers by the Manage Server Database module 812.

Additionally, any transfers of user index records from one server to a more local server (in case of the user relocating to another location) is performed by the Manage Server database module 812.

Figure 9:
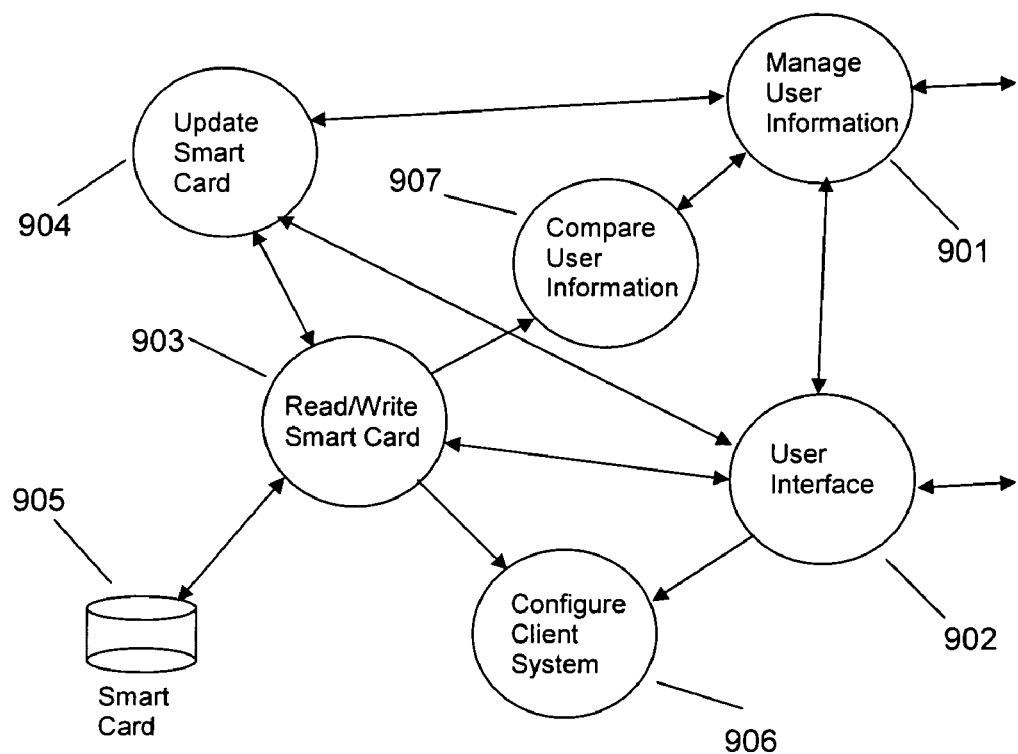
FIG. 9 is a block schematic diagram of a task-oriented viewpoint of a preferred embodiment of the invention illustrating the client and server tasks for a client-based data management system according to the invention.
Figure 9:
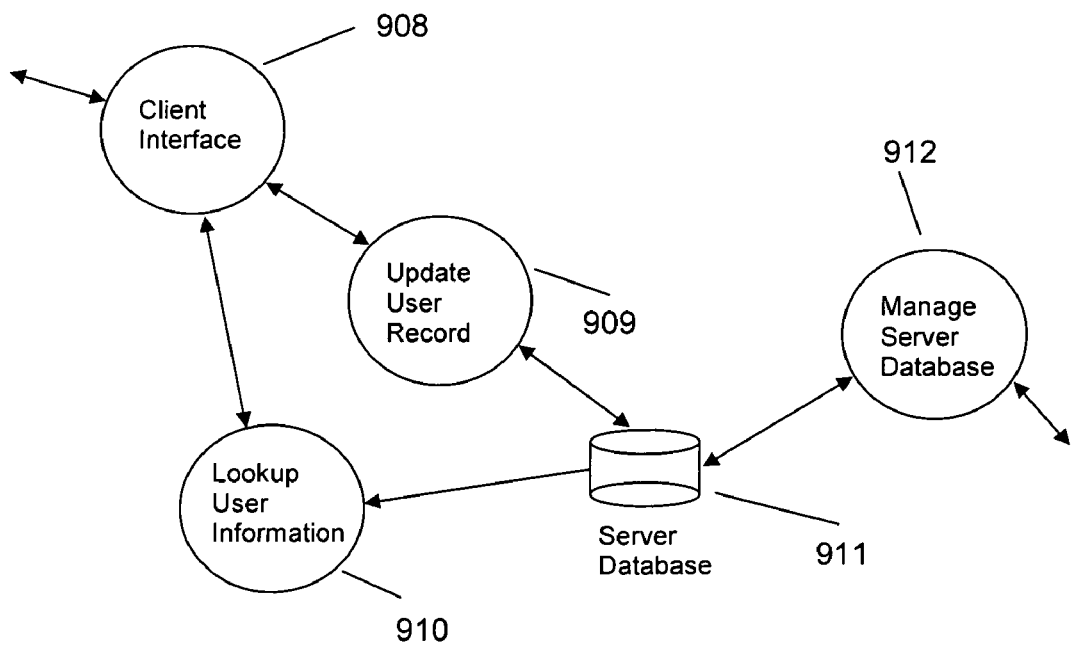

Referring to FIG. 9, another preferred embodiment of the invention is shown that performs that same basic functions as those described in FIG. 8, except that the client has a server connection that is most likely temporary in nature, e.g., a dialup modem connection. The difference in operation between FIGS. 8 and 9 is when the user manages his indices on his smart card and server database. The client connects to the Client Interface module 908 on the server through the Manage User Information module 901, resident on the client. The Client Interface 908 collects the user's indices for the Manage User Information module 901. The user's records are retrieved from the Server Database 911 by the Lookup User Information module 910.

Once the user's indices are received by the Manage User Information module 901, the client can disconnect from the server and the user manages his indices offline with the client. The Compare User Information module 907 operates in the same manner as described above. The information obtained from the Server database 911 and the Smart Card 905 are displayed to the user through the User Interface 902. After the user has updated his indices and any changes to the user's records on the Server Database 911 are required, the client reconnects with the server's Client Interface 908. The Server Database 911 is updated with any changes by the Update User Record module 909.

Yet another preferred embodiment of the invention encrypts the entire Server Database 911. Each user record is individually encrypted such that if one user record is accessed and decrypted by a hacker, the other user records will not be compromised in any way. The actual encryption of a user record is performed by the client. The Manage User Information module 901 retrieves the user's encrypted record from the server. If this fails, then the user must create a new record to access. The server looks up, using the Smart Card's 905 ID, and retrieves the user's record through the Lookup User Information module 910. The server does not know what the contents of the record are, only that the record belongs to the user (much like a safety deposit box). The record is sent back to the client via the Client Interface module 908.

The Manage User Information module 901 decrypts the user record using the Smart Card 905 encryption key information stored in the Smart Card 905. Each smart card is unique and the encryption key only exists on a particular smart card and not on the server. Once the user has completed any changes to the indices in the record, the Manage User Information module 901 encrypts the user record using the encryption key on the Smart Card 905 and sends the record back to the server. The Client Interface module 908 sends the encrypted record to the Update User Record module 909 which replaces the user record in the Server Database 911 with the new encrypted user record.

This approach ensures that there is a one-to-one mapping of user records to smart cards; each user record in the Server database 911 can only be decrypted by a specific smart card. It also ensures that the Server Database 911 is secure and cannot be easily compromised. The intruder would have to physically have every existing smart card to crack the entire database.

If a user loses his smart card, then there is a procedure where the smart card can be morphed, or recreated. The user inserts a new Smart Card 905 into the client system. The system through the User Interface module 902 has the user enter in his personal information in the same manner as when he first created his original smart card. The new Smart Card 905 is then initialized and the encryption key is recreated. The new smart card's ID is sent to the Client Interface module 908 from the User Interface module 902 via the Manage User Information module 901. The Update User Record module 909 removes the original smart card's ID from the user's record on the Server Database 911 and replaces it with the new smart card's ID. Once that is completed, the User Interface module 902 then places the encryption key in the new Smart Card 905 via the Read/Write Smart Card module 903. The user's smart card has now been recreated and the original smart card disabled.

The server has the ability to simultaneously perform the server functions described in FIGS. 8 and 9. This allows the server to handle both secure Web access and clients that have temporary server connections.

One skilled in the art will readily appreciate that although the client and server functionality are described separately above, both the client and server can reside on the same physical machine.

The smart card can also be used to provide exclusive access to a specific computer. For example, when a user travels, he normally carries his laptop computer as well as his smart card. The smart card allows the user to go to any computer and use his mobile personal computing environment as described above. It further allows the user to exclusively access his personal laptop computer. The laptop computer is matched to the users smart card and will not allow any other users to access the laptop without that specific smart card.

Figure 10:
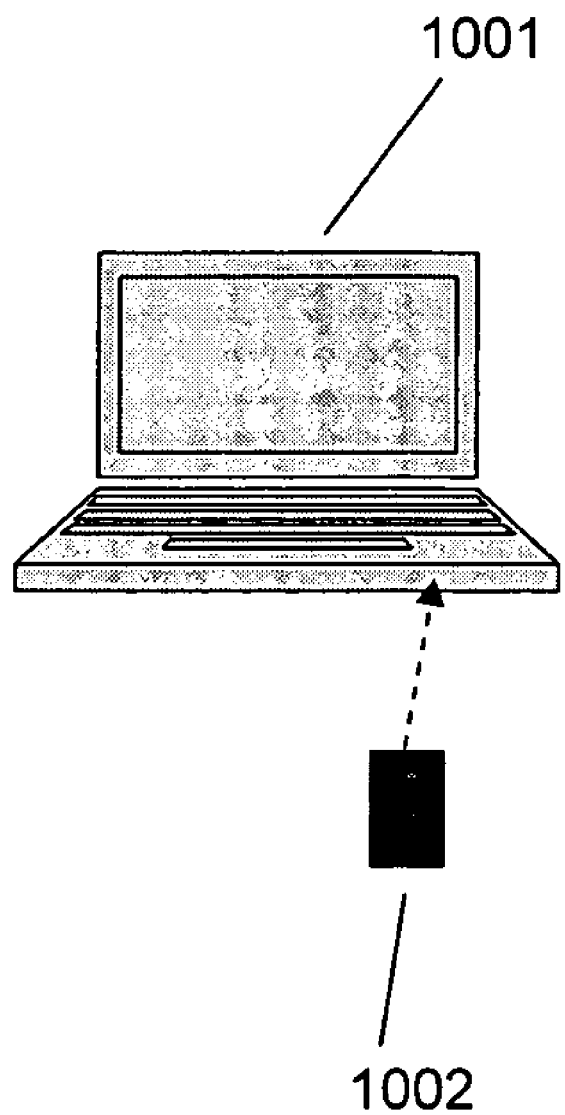
FIG. 10 is a diagram depicting a smart card capable laptop computer according to the invention.

With respect to FIG. 10, the computer 1001 has a smart card reader either onboard or attached. The computer 1001 is configured to boot after confirming that the proper smart card 1002 is inserted or, in the absence of the smart card, that the proper password is entered. The user typically has the smart card 1002 already inserted into the computer 1001.

When the smart card 1002 is inserted into the computer 1001, the computer 1001 boots up into its normal operating system. The user uses the computer in his usual fashion. For example, when the user is in his network browser, the invention allows him to enter networks and Web sites that require a login procedure and, using the user's passwords stored on the smart card 1002, automatically login to the site. The computer 1001 accesses the passwords stored on the smart card 1002 and finds the name of the network or address of the Web site and the corresponding username and password for the network or site. The username and password are entered into the network or Web site's login query by the computer 1001, thereby logging the user onto the network or Web site.

However, when the user loses his smart card, his computer is inaccessible. Typically, the user must call the smart card service provider or go to the provider's service center to obtain a replacement smart card. The invention provides a solution to this problem and allows the user to not only access his computer, but to morph the mobile personal environment data that was present on his lost smart card onto his new smart card.

Figure 11:
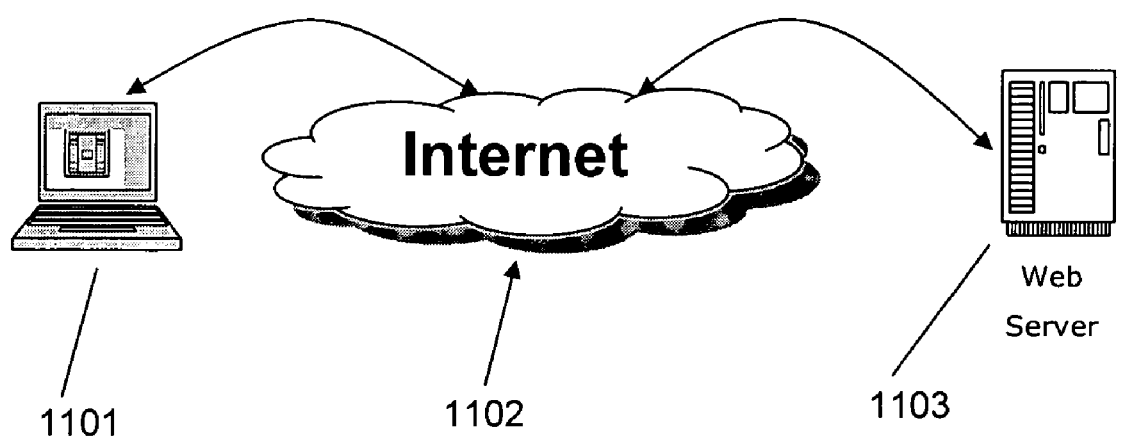
FIG. 11 is a block schematic diagram of a client computer communicating across the Internet to the Secure Web server according to the invention.
Figure 12:
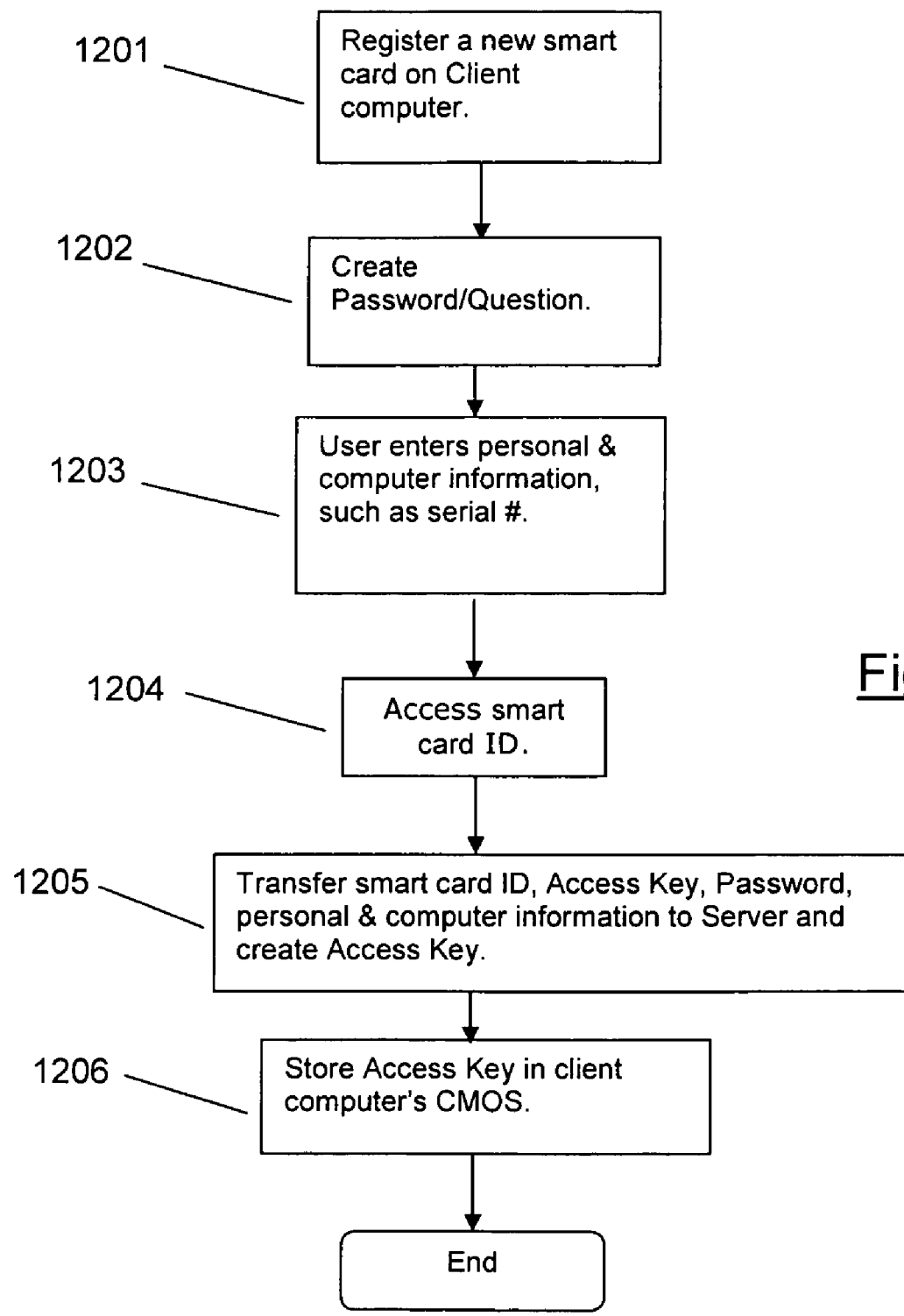
FIG. 12 is a flowchart showing the schema for creating a new smart card for a client computer according to the invention.

Referring to FIGS. 11 and 12, a secure Web site and server 1103 are provided that allows smart card users to easily create and obtain smart cards and passwords. On first startup using the invention, the user's computer 1101 starts the invention's client computer program. The client computer program begins registration of the new smart card 1201. A password and user question are created 1202. The password is used for access to the server if the smart card is lost and the user question is used to confirm the user's identity when challenged while accessing the server 1103 without a smart card.

The user enters his personal information and the other system specific information, e.g., the computer's serial number, into the client program 1203. The client program then accesses the smart card inserted into the computer 1101 and retrieves the smart card's ID 1204. The information is confirmed, the data (e.g., user's personal information, computer's serial number, smart card ID, password, etc.) are sent to the server 1103 across the Internet or network 1102 and an access key is created 1205. The server creates the access key through pseudo-random means or other means, possibly based on the smart card's ID.

The access key and the smart card ID are then stored in the user's computer's 1101 CMOS or non-volatile memory for boot-up access and the user's computer 1101 is configured for smart card secure access 1206. The user's computer will now boot only if the proper smart card is installed or the proper access key is entered when the smart card is unavailable. An emergency diskette is optionally created and the user's computer can boot using the diskette as a replacement for the smart card.

Figure 13:
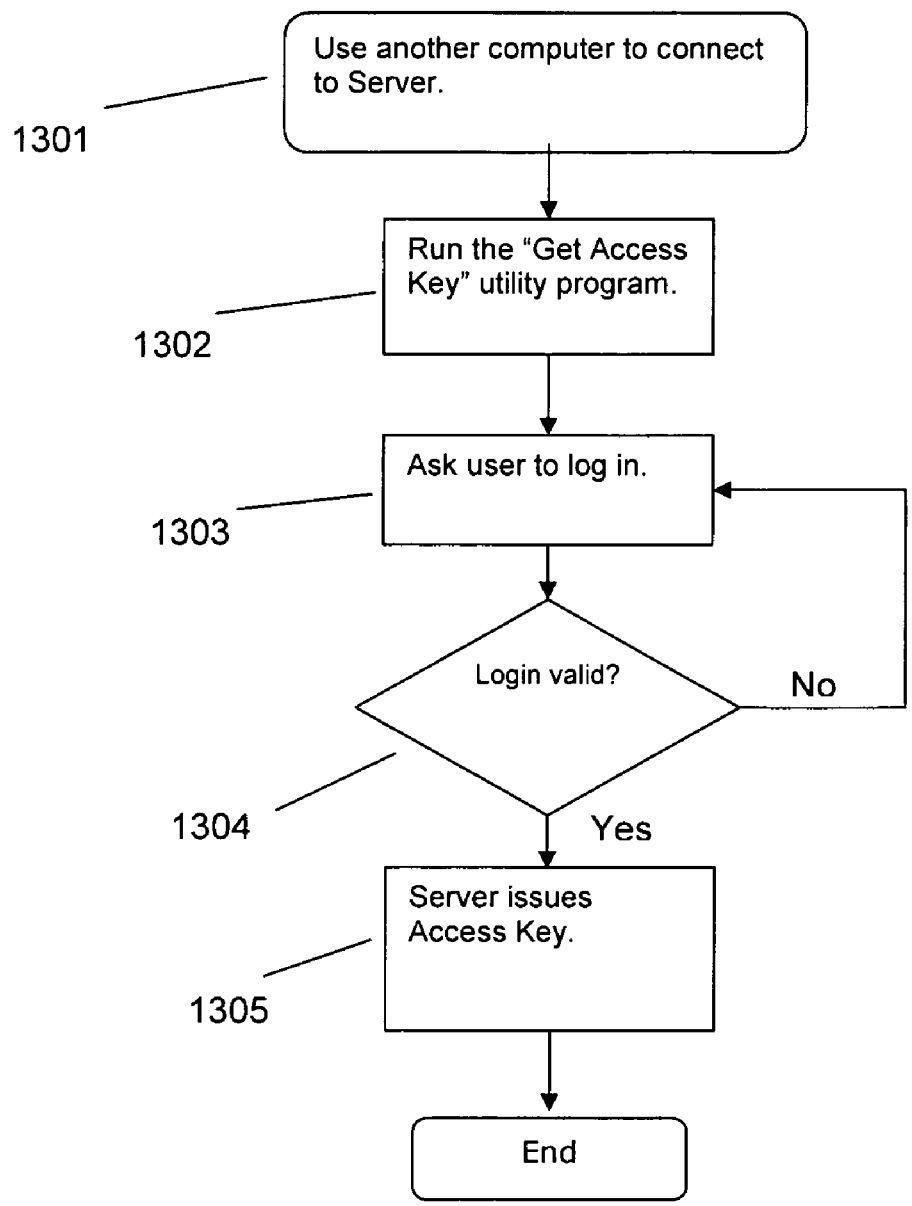
FIG. 13 is a flowchart showing the schema for obtaining an access key for accessing a client computer according to the invention.

With respect to FIG. 13, if the user loses his smart card (and emergency diskette), then he must gain access to his computer through the access key route. The user accesses the server 1103 through another computer 1301. Access to the server 1103 is gained through a utility program 1302. The server 1103 asks the user log in (possibly using user and/or system specific information) 1304 which is checked by the server 1103. If the login is incorrect, the server will ask for it again 1303. Otherwise, the server, issues the access key 1305 that the user will use to gain access to his computer.

Figure 14:
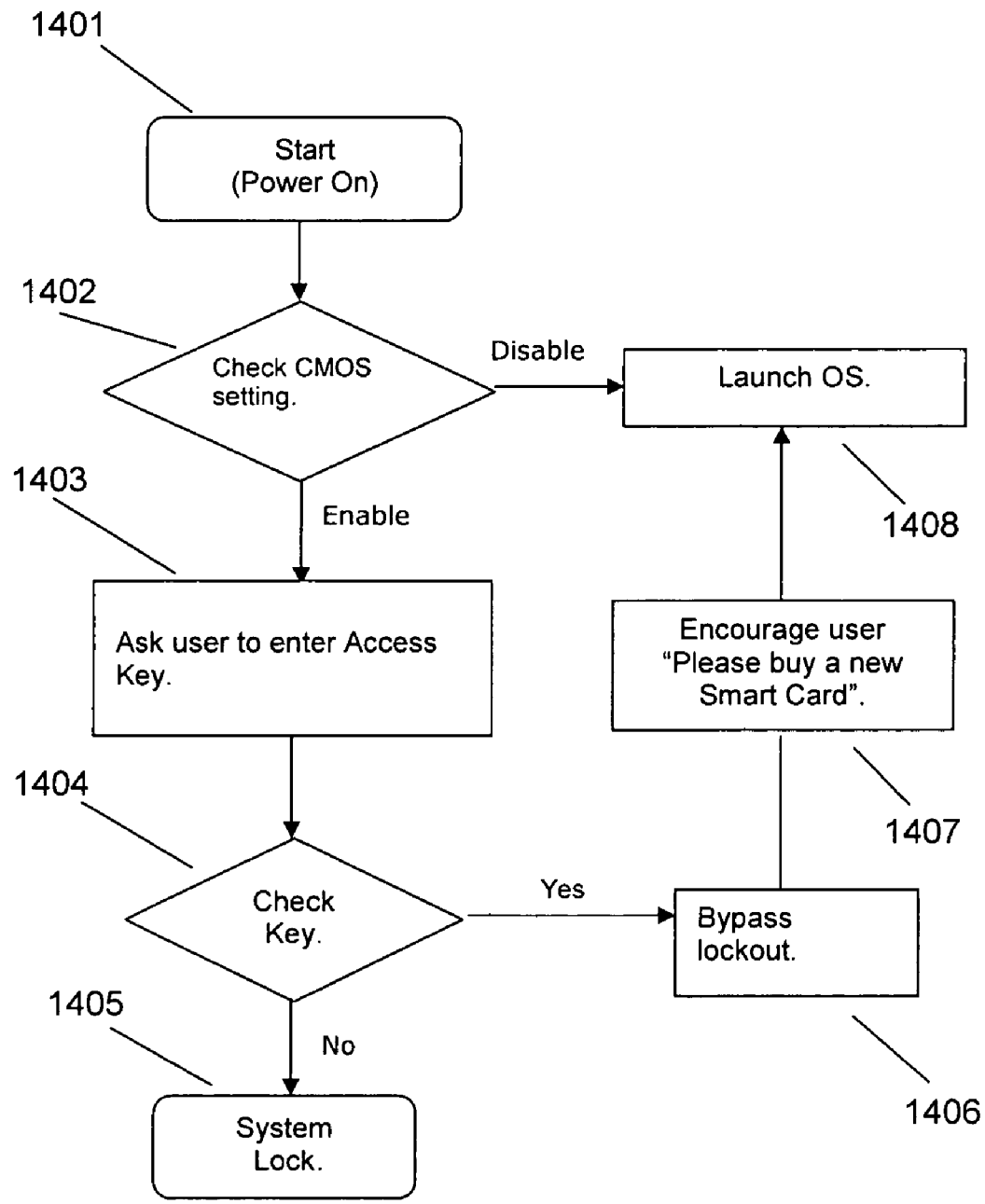
FIG. 14 is a flowchart showing the steps that a client computer follows for booting up without a smart card according to the invention.

Referring to FIG. 14, the user's computer starts up 1401 and since there is no smart card inserted, it checks its boot program to see if it is in secure mode 1402. If it is not, then it simply starts the operating system 1408. If it is in secure mode, then the computer asks the user to enter his access key 1403 that he obtained from the server 1103. The access key is checked against the stored access key for validity 1404. If it is not valid, then the system locks 1405. If the access key is valid, then the system bypasses the lockout 1406, encourages the user to get anew smart card 1407, and starts the operating system 1408.

If the proper smart card is installed and readable, the computer simply checks the smart card's ID with the stored ID and boots if it is valid. Otherwise, it defaults to the procedure above.

Referring again to FIG. 8, the user plugs his Smart Card 805 into the smart card reader that is connected to, or resident in, the client computer. The Configure Client System module 806 reads the Smart Card 805 through the Read/Write Smart Card module 803. The User Interface 802 communicates with the user on creation of passwords, challenge questions, entry of user information, and computer information. The Server Interface 801 sends user data, Smart Card ID, and computer information to the Manage User Information module 807.

The Lookup User Information 810 finds the user record containing the computer serial number, access key, password, challenge question, etc. The Update User Record module 809 updates the user record with any new information. The Update User record module 809 also creates the access key, updates the user record with the access key, and sends the access key to the Manage User Interface module 807 which then sends the access key to the Server Interface 801. The Server Interface 801 forwards the access key to the User Interface 802 and the Configure Client System 806. The Configure Client System 806 installs the Smart Card ID and access key into the client computer's CMOS or non-volatile memory.

Figure 15:
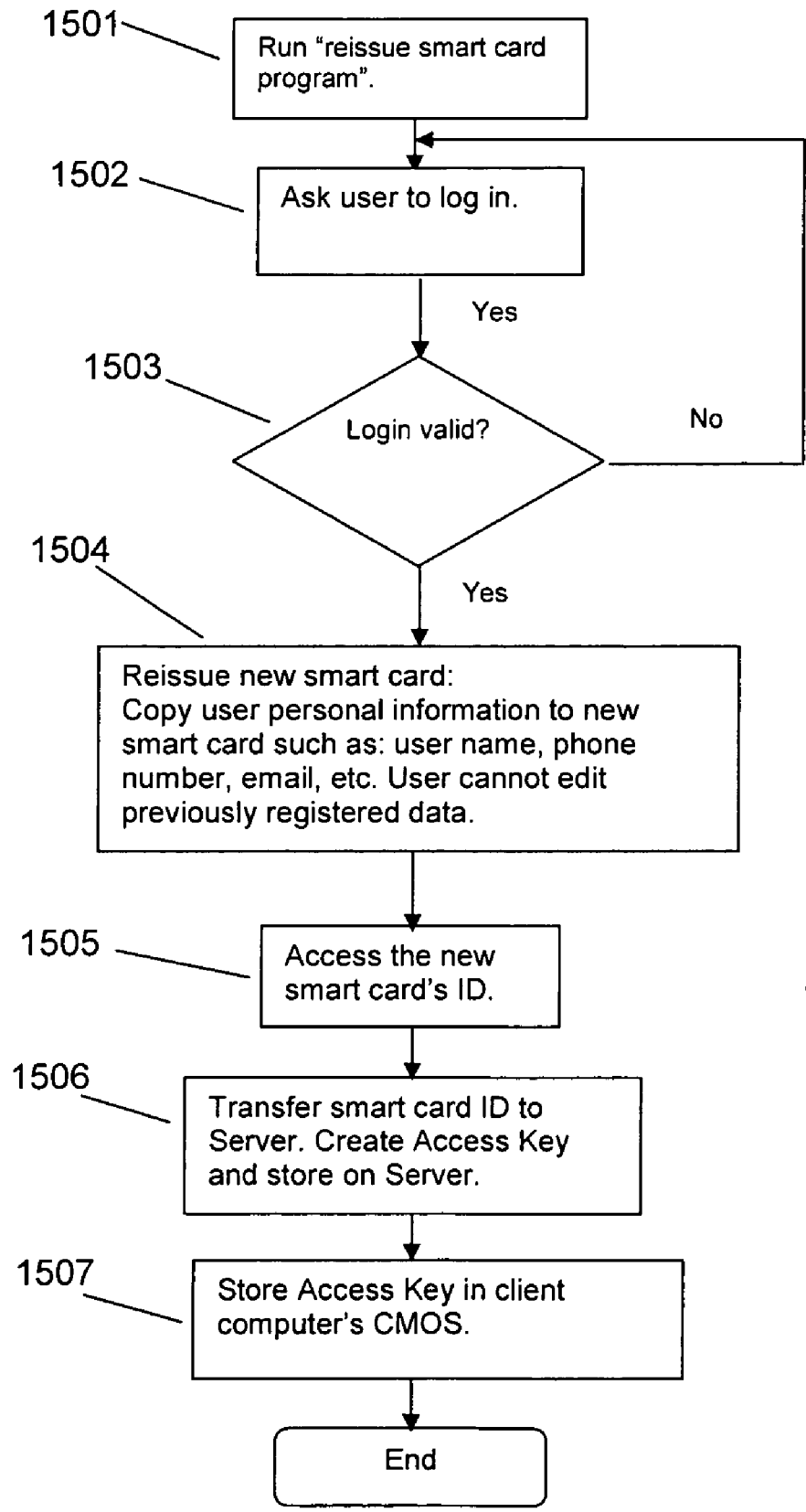
FIG. 15 is a flowchart showing the schema for replacing a smart card according to the invention.

With respect to FIG. 15, when the user wants to get a new smart card issued, he runs the smart card utility program 1501 on his computer 1101. The user logs in (possibly using user and/or system specific information) 1502 which is verified 1502 by the server 1103. If it is incorrect, the user will be queried for it again.

Otherwise, the user's information, obtained from the server 1103, such as name, email, phone number, computer information, etc., is entered into the smart card's memory 1504. To keep the smart card as secure as possible, the user's information cannot be edited by the user until after the card has been successfully issued. The new smart card's ID is retrieved from the smart card 1505. The smart card's ID is sent 1506 to the server 1103 to replace the previous smart card's ID and the server 1103 generates a new access key and stores it 1506. The new access key and the smart card's ID are stored in the user's computer's CMOS or non-volatile memory for the boot sequence 1507.

Alternatively, the creation of a new access key can be performed at a later time.

Figure 16:
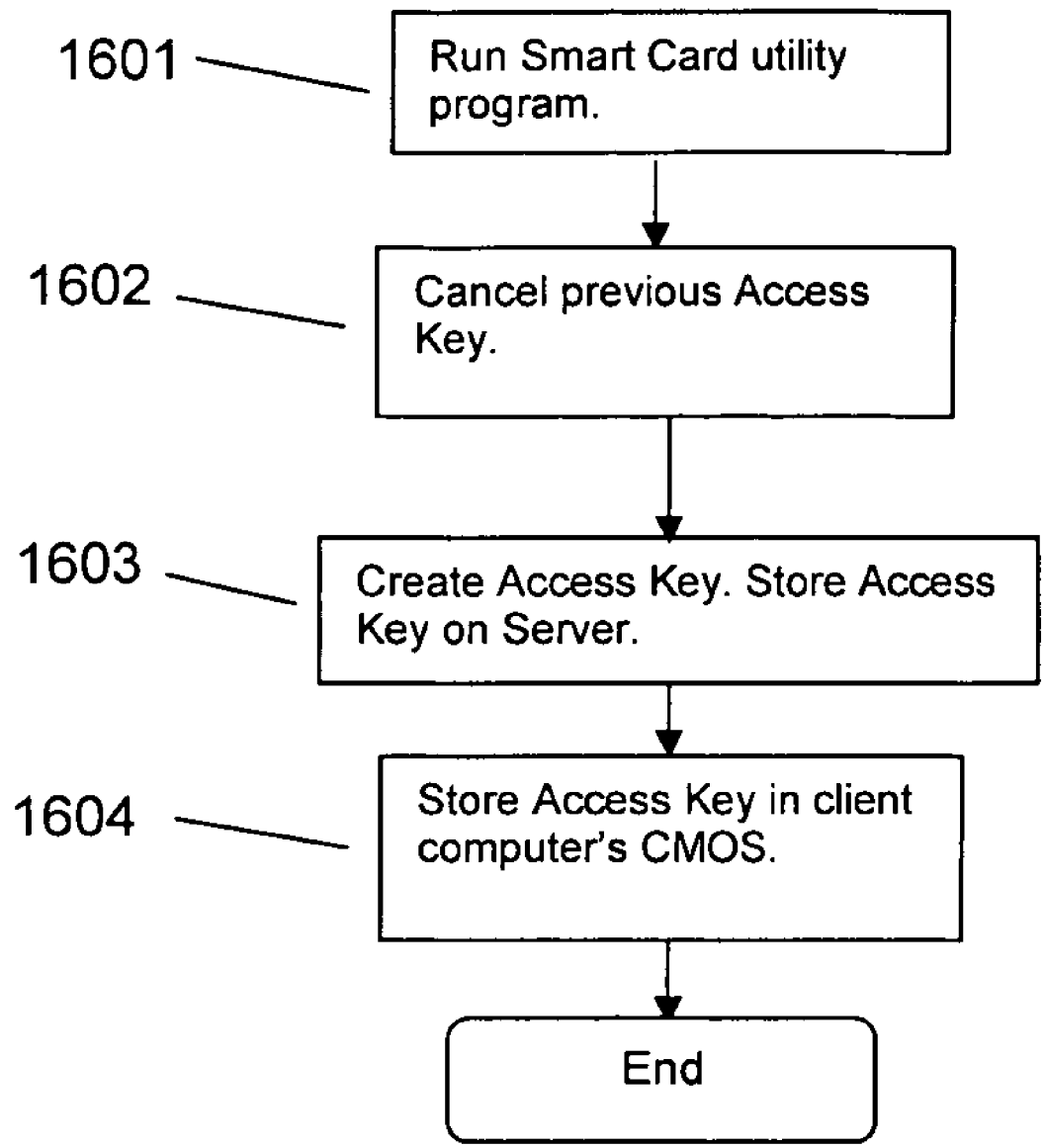
FIG. 16 is a flowchart showing the schema for replacing an old access key with a new access key according to the invention.

Referring to FIG. 16, once the user has a valid smart card, he can change the access key at any time. The user logs onto the Web server 1103 through his computer 1101 and has the server 1103 generate a new access key. The user runs the smart card utility program 1601 to coordinate with the server 1103. The server 1103 cancels the previous access key 1602, creates a new access key, and stores it 1603. The new access key is then stored in the user's computer's CMOS memory for the boot sequence 1604.

If the user wants to morph the data from the previous smart card after the process in FIG. 15, the invention follows the morphing procedure described above.

Figure 17:
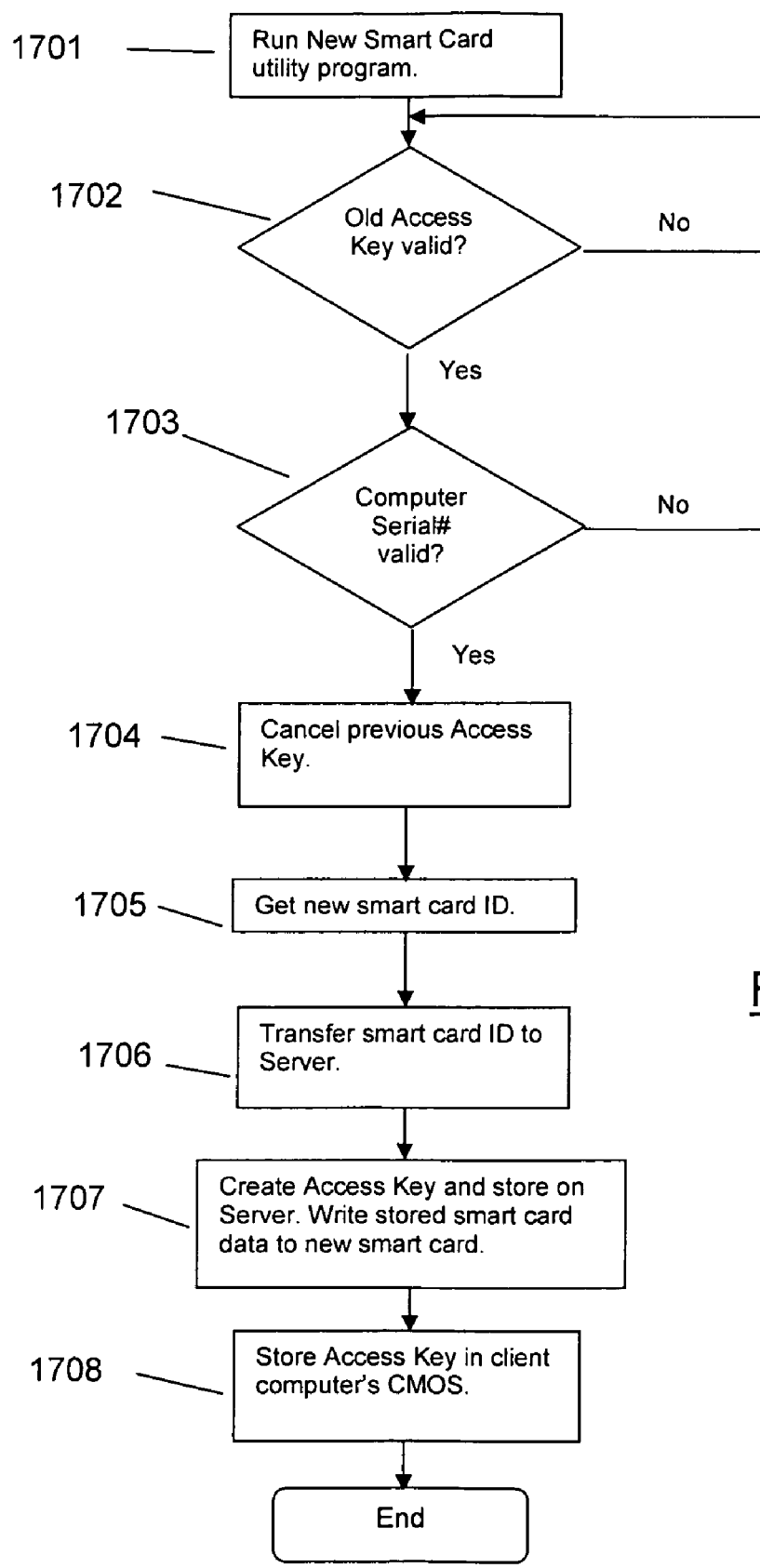
FIG. 17 is a flowchart showing the schema for morphing the data from an old smart card onto a new smart card according to the invention.

With respect to FIG. 17, as noted above, the invention can also morph the user's previous smart card containing his personal computing environment at the time that he creates a new smart card. The user runs the smart card utility 1701. The user enters the server by entering the old access key or other user and system specific information which is verified by the server 1702. The server can perform lookups based on the access key other user and system specific information or the computer serial number. If the information is not valid, then the user is asked to reenter it 1702. If the information is valid, then the old access key is canceled 1704, the smart card ID is retrieved 1705, and sent to the server 1706.

The data and rights that the server knows were stored on the previous smart card are transferred into the new smart card 1707. The server disables the previous smart card's registration and makes the new smart card the valid card. The previous smart card's encryption and other rights are disabled in the server database and the new smart card is given those rights. As noted above, the server data base is encrypted such that the smart card can decrypt the information when it reaches the client.

The server also generates a new access key and stores it 1707. The new access key and smart card ID are stored in the user's computer's CMOS or non-volatile memory for the boot sequence 1708.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A process for storing and recovering security information stored on a first transportable memory device that is used to uniquely access a client computer and secure logins into networks and Web sites, comprising the steps of:

providing a secure server;

creating a password and challenge question;

wherein said password is used to access said server if said first transportable memory device is lost and said challenge question is used to confirm the user's identity when challenged while accessing said server without a transportable memory device;

retrieving an ID number of said first transportable memory device and other user and system specific information;

storing said first transportable memory device ID and said other user and system specific information on said server;

providing access key creation means on said server for creating a first access key;

storing said first access key on said server;

providing configuration means for configuring said client to boot only if said first transportable memory device is readable by said client or said first access key is entered;

wherein said access key creation means creates a second access key upon request by the user;

replacing said first access key with said second access key on said server; and wherein said configuration means configures said client to boot if said second access key is entered, thereby replacing said first access key.

2. The process of claim 1, wherein an emergency diskette is created and said client can boot using said diskette instead of said first transportable memory device.

3. The process of claim 1, wherein the user accesses said server through another computer; wherein said server requires the user to log in; and wherein said server displays a current access key to the user if said log in is correct.

4. The process of claim 1, wherein the user enters a current access key into said client; and wherein said client boots in response to said current access key.

5. The process of claim 1, further comprising the steps of:

wherein the user requests that said server issue a second transportable memory device to replace said first transportable memory device;

retrieving the ID number from said second transportable memory device;

replacing said first transportable memory device ID with said second transportable memory device ID on said server; and wherein said configuration means configures said client to boot if said second transportable memory device is readable, thereby replacing said first transportable memory device.

6. The process of claim 5, wherein said server requires the user to enter the proper user and/or other system specific information to validate said request.

7. The process of claim 5, further comprising the step of:

wherein said access key creation means creates a third access key;

replacing said first access key with said third access key on said server; and wherein said configuration means configures said client to boot if said third access key is entered, thereby replacing said first access key.

8. The process of claim 5, further comprising the step of:

providing morphing means for recreating a personal computing environment stored on said first transportable memory device onto said second transportable memory device.

9. The process of claim 8, wherein said morphing means transfers encryption and other rights of said first transportable memory device to said second transportable memory device.

10. The process of claim 1, further comprising the step of:
providing automatic login means resident on said client for logging onto networks and/or Web sites, without the user's intervention, using the user's information stored on said first transportable memory device.

11. A process for storing and recovering security information stored on a first transportable memory device that is used to uniquely access a client computer, comprising the steps of:
providing a secure server;
retrieving the ID number of said first transportable memory device and other user and system specific information;
storing said first smart card ID and said other user and system specific information on said server;
providing access key creation means on said server for creating a first access key;
storing said first access key on said server;
providing configuration means for configuring said client to boot only if said first transportable memory device is readable by said client or said first access key is entered;
wherein said access key creation means creates a second access key upon request by the user;
replacing said first access key with said second access key on said server; and
wherein said configuration means configures said client to boot if said second access key is entered, thereby replacing said first access key.

12. The process of claim 11, further comprising the step of:
creating a password and challenge question; and
wherein said password is used to access said server if said first transportable memory device is lost and said challenge question is used to confirm the user's identity when challenged while accessing said server without a transportable memory device.

13. The process of claim 11, wherein an emergency diskette is created and said client can boot using said diskette instead of said first transportable memory device.

14. The process of claim 12, wherein the user accesses said server through another computer; wherein said server requires the user to log in; and wherein said server displays a current access key to the user if said log in is correct.

15. The process of claim 11, wherein the user enters a current access key into said client; and wherein said client boots in response to said current access key.

16. The process of claim 11, further comprising the steps of:
wherein the user requests that said server issue a second transportable memory device to replace said first transportable memory device;
retrieving the ID number from said second transportable memory device;
replacing said first transportable memory device ID with said second transportable memory device ID on said server; and
wherein said configuration means configures said client to boot if said second transportable memory device is readable, thereby replacing said first transportable memory device.

17. The process of claim 16, wherein said server requires the user to enter the proper user and/or other system specific information to validate said request.

18. The process of claim 16, further comprising the step of:
wherein said access key creation means creates a third access key;
replacing said first access key with said third access key on said server; and
wherein said configuration means configures said client to boot if said third access key is entered, thereby replacing said first access key.

19. The process of claim 16, further comprising the step of:
providing morphing means for recreating a personal computing environment stored on said first transportable memory device onto said second transportable memory device.

20. The process of claim 19, wherein said morphing means transfers encryption and other rights of said first transportable memory device to said second transportable memory device.

21. The process of claim 11, further comprising the step of:
providing automatic login means on said client for logging onto networks and/or Web sites, without the user's intervention, using the user's information stored on said first transportable memory device.

22. A program storage medium readable by a computer, tangibly embodying a program of instructions executable by the computer to perform method steps for storing and recovering security information stored on a first transportable memory device that is used to uniquely access a client computer, comprising the steps of:
providing a secure server;
creating a password and challenge question;
wherein said password is used to access said server if said first transportable memory device is lost and said challenge question is used to confirm the user's identity when challenged while accessing said server without a transportable memory device;
retrieving the ID number of said first transportable memory device and other user and system specific information;
storing said first transportable memory device ID and said other user and system specific information on said server;
providing access key creation means on said server for creating a first access key;
storing said first access key on said server;
providing configuration means for configuring said client to boot only if said first transportable memory device is readable by said client or said first access key is entered;
wherein said access key creation means creates a second access key upon request by the user;
replacing said first access key with said second access key on said server; and
wherein said configuration means configures said client to boot if said second access key is entered, thereby replacing said first access key.

23. The method of claim 22, wherein an emergency diskette is created and said client can boot using said diskette instead of said first transportable memory device.

24. The method of claim 22, wherein the user accesses said server through another computer; wherein said server requires the user to log in; and wherein said server displays a current access key to the user if said log in is correct.

25. The method of claim 22, wherein the user enters a access key into said client; and wherein said client boots in response to said current access key.

26. The method of claim 22, further comprising the steps of:
wherein the user requests that said server issue a second transportable memory device to replace said first transportable memory device;
retrieving the ID number from said second transportable memory device;
replacing said first transportable memory device ID with said second transportable memory device ID on said server; and
wherein said configuration means configures said client to boot if said second transportable memory device is readable, thereby replacing said first transportable memory device.

27. The method of claim 26, wherein said server requires the user to enter the proper user and/or other system specific information to validate said request.

28. The method of claim 26, further comprising the step of:
wherein said access key creation means creates a third access key;
replacing said first access key with said third access key on said server; and
wherein said configuration means configures said client to boot if said third access key is entered, thereby replacing said first access key.

29. The method of claim 26, further comprising the step of:
providing morphing means for recreating a personal computing environment stored on said first transportable memory device onto said second transportable memory device.

30. The method of claim 29, wherein said morphing means transfers encryption and other rights of said first transportable memory device to said second transportable memory device.

31. The method of claim 22, further comprising the step of:
providing automatic login means resident on said client for logging onto networks and/or Web sites, without the user's intervention, using the user's information stored on said first transportable memory device.

32. A program storage medium readable by a computer, tangibly embodying a program of instructions executable by the computer to perform method steps for storing and recovering security information stored on a first transportable memory device that is used to uniquely access a client computer, comprising the steps of:
providing a secure server;
retrieving the ID number of said first transportable memory device and other user and system specific information;
storing said first transportable memory device ID and said other user and system specific information on said server;
providing access key creation means on said server for creating a first access key;
storing said first access key on said server;
providing configuration means for configuring said client to boot only if said first transportable memory device is readable by said client or said first access key is entered;
wherein said access key creation means creates a second access key upon request by the user;
replacing said first access key with said second access key on said server; and
wherein said configuration means configures said client to boot if said second access key is entered, thereby replacing said first access key.

33. The method of claim 32, further comprising the step of:
creating a password and challenge question; and
wherein said password is used to access said server if said first transportable memory device is lost and said challenge question is used to confirm the user's identity when challenged while accessing said server without a transportable memory device.

34. The method of claim 32, wherein an emergency diskette is created and said client can boot using said diskette instead of said first transportable memory device.

35. The method of claim 33, wherein the user accesses said server through another computer; wherein said server requires the user to log in; and wherein said server displays a current access key to the user if said log in is correct.

36. The method of claim 32, wherein the user enters a current access key into said client; and wherein said client boots in response to said current access key.

37. The method of claim 32, further comprising the steps of:
wherein the user requests that said server issue a second transportable memory device to replace said first transportable memory device;
retrieving the ID number from said second transportable memory device;
replacing said first transportable memory device ID with said second transportable memory device ID on said server; and
wherein said configuration means configures said client to boot if said second transportable memory device is readable, thereby replacing said first transportable memory device.

38. The method of claim 37, wherein said server requires the user to enter the proper user and/or other system specific information to validate said request.

39. The method of claim 37, further comprising the step of:
wherein said access key creation means creates a third access key;
replacing said first access key with said third access key on said server; and
wherein said configuration means configures said client to boot if said third access key is entered, thereby replacing said first access key.

40. The method of claim 37, further comprising the step of:
providing morphing means for recreating a personal computing environment stored on said first transportable memory device onto said second transportable memory device.

41. The method of claim 40, wherein said morphing means transfers encryption and other rights of said first transportable memory device to said second transportable memory device.

42. The method of claim 32, further comprising the step of:
providing automatic login means resident on said client for logging onto networks and/or Web sites, without the user's intervention, using the user's information stored on said first transportable memory device.

* * * * *